United States Patent
Shen

(10) Patent No.: US 6,589,460 B1
(45) Date of Patent: Jul. 8, 2003

(54) ADHESIVE COMPOSITION AND ITS USE

(76) Inventor: Kuo Cheng Shen, 2118 Radford Court, Ottawa, Ontario K1J 8K1 (CA)

(*) Notice: Subject to any disclaimer, the term of this patent is extended or adjusted under 35 U.S.C. 154(b) by 0 days.

(21) Appl. No.: 09/367,657

(22) PCT Filed: Feb. 19, 1998

(86) PCT No.: PCT/IB98/00607

§ 371 (c)(1),
(2), (4) Date: Dec. 6, 1999

(87) PCT Pub. No.: WO98/37147

PCT Pub. Date: Aug. 27, 1998

(30) Foreign Application Priority Data

Feb. 20, 1997 (EP) .............................. 97102778

(51) Int. Cl.$^7$ ............................ C08L 97/02; B27N 1/00
(52) U.S. Cl. ....................................... 264/109; 264/122
(58) Field of Search ................................. 264/109, 122, 264/123, 129

(56) References Cited

U.S. PATENT DOCUMENTS 2,639,994 A * 5/1953 Wilson ........................ 264/129

FOREIGN PATENT DOCUMENTS

| EP | 0063404 | 10/1982 |
|----|---------|---------|
| JP | 58-055146 | 1/1983 |
| JP | 63-023924 | 2/1988 |

OTHER PUBLICATIONS

XP–002074531" Aufbereitung Des Holzes Durch Partielle Hydrolyse Vom Standpunkt Seiner Kimplexen Nutzung", Jozef Pajtik, et al., Cellulose Chem. Technol.. 20, 641–649 (1986).

XP–002074532 Abstract for Japanese Patent Publication No. 63–023924 (Solid phase polymerisation of polyester— used for bottles containing carbonated beverages, involves polymerisation of initial polymerisable compound comprising mainly ethylene terephthalate)—See Above.

XP–002074533, Copyright 1998 ACS, Manufacture of water–resistant particleboard, Richard Bares, Alois Vasicek, Abstract.

XP–002074534, Apr. 7, 1991 WPI/Derwent, "Mixture for coldsetting foundry cores and moulds manufacture—contains refractory filler, green molasses, lignosulphonate(s), orthophosphoric acid and magnesia based material" Abstract.

PCT International Search Report Dated Aug. 18, 1998 for International Application No. PCT/IB98/00607.

* cited by examiner

Primary Examiner—Mathieu D. Vargot
(74) Attorney, Agent, or Firm—Renner, Otto, Boiselle & Sklar, LLP

(57) ABSTRACT

For producing chip or fiber boards or like articles by bonding particulate lignocellulosic material like chips or fibers with tannin-based adhesives like tannin resins or tannin containing resins, the lignocellulosic material is pre-hydrolyzed by means of adding acids, acidic salts or other acid liberating chemical compounds prior to adding a particular composition of adhesive material.

11 Claims, No Drawings

ADHESIVE COMPOSITION AND ITS USE

The present invention relates to the use of water-soluble carbohydrates and phenolic compounds as thermosetting adhesives.

Typically, exterior grade composite and panel wood products are bonded with synthetic adhesives. Phenol-formaldehyde resin adhesives are used in more than 90% of exterior grade composite products. However, the finite supply of fossil fuels, coupled with an increasing global demand for wood products, has created a need for an alternative, environmentally sound adhesive system based on renewable resources. At the same time, the need to produce uniform and high quality composite products from lower cost raw material such as smaller diameter logs, wood processing by-products such as sawdust and bark, and agricultural wastes, has created a need for improved bonding products and processes.

Renewable resources, such as carbohydrates and phenolics, and particularly those of a lignocellulosic nature, have been investigated as a possible source of constituents suitable in exterior grade adhesives. To date, few adhesive systems based on renewable source have been successfully adapted for commercial application. Generally, such adhesives do not possess adequate properties, suffering from weak bond strength and poor handling qualities, to meet the standards required of composite products. Those renewable source adhesives capable of meeting today's composite product standards are usually too expensive to compete with existing synthetic resins, often requiring extensive chemical modification and/or extremely long curing times.

Nonetheless, the components of lignocellulosic materials have been extensively studied in hopes of finding a renewable source adhesive suitable for commercial use in composite wood products. Wood, similar to other plant resources, is composed of about 45 to 50% cellulose, 20 to 35% hemicellulose, 20 to 25% lignin, and >0 to 10% extractives. Chemically, cellulose is the main structural component of all plant cell walls, and is a linear polysaccharide built up from anhydro glucose units having the general formula $(C_6H_{10}O_5)_n$. Cellulose is the most abundant source of carbohydrates in plants. Upon acid hydrolysis cellulose converts into glucose.

Hemicelluloses are a group of heterogenous polysaccharides that, next to cellulose, constitute the most abundant sources of carbohydrates in plants. Hemicellulose, associated with the cell wall, is highly soluble in alkali and is relatively easy to degrade by an acid hydrolysis into simple sugars or sugars acids. Hemicellulose may be repeated by the general formula $(C_5H_8O_4)_{n1} (C_6H_{10}O_5)_{a2}$, representing five and six carbon sugars such as pentosan and hexosan. Upon acid hydrolysis hemicellulose converts into various reducing sugars.

The third major component of lignocellulose is lignin, which is phenolic in character and acts as the natural binder within the lignocellulose to cement cells together. The precursors of lignin and its formation in lignocellulosic material are still not completely understood, however, recently, considerable progress has been made in this area of research. It is generally accepted that lignin is a polymeric material composed of phenyl propane units that are linked together by carbon to carbon as well as carbon to oxygen (ether) bonds.

The minor component of lignocellulose consists of extractives. All plants and agricultural vegetation contain a number of organic substances that can be extracted with organic solvents, or in some cases, with water. Among these belong aliphatic, aromatic and alicyclic compounds, hydrocarbons, alcohols, ketones, and various types of acids and phenol compounds. Furthermore, sterols, tannins, essential oils, resins, dyestuffs, proteins, wax, and some alkaloids are found.

Carbohydrates have been explored in the past as both coreactants with phenolic resin and as the sole ingredient in adhesive. Meigs (U.S. Pat. No. 1,593,342, 1,801,053 and 1,868,216) carried out some of the early work with a phenol-carbohydrate combination. Meigs was searching for a process to produce solid, fusible, thermoset molding compounds. The reactions used both acidic and base catalysts and often introduced coreactions with aniline or aliphatic amines. In other examples, Chang and Kononenko (Sucrose-Modified Phenolic Resin as Plywood Adhesives, Adhesives Age 5(7):36–40, 1962) developed an adhesive system by coreacting sucrose in a phenol-formaldehyde resin formulation under alkaline conditions. More recently, Gibbons and Wondolowski (Can. Pat. 1,090,026) reacted carbohydrates with phenol and urea, or a diamine, in the presence of an acid catalyst to produce a fusible resin for bonding wood products.

Other investigators have used acidic conditions only to produce carbohydrate-based resin. Mudde (Corn Starch: A Low Cost Route to Novolac Resins. Mod Plast. 57(2): 69;74, 1980) described a method that relied on the acidic conversion of starch to 5hydroxymethyl furfural—2 formaldehyde for condensing with phenol in a Novolac resin. Turner et al., (DE-A-1,905,054) investigated carbohydrates, not involving phenol as a coreactant, and produced a water-resistant adhesive. Turner et al. degraded pentose and hexose sugars with acid, while coreacting with such materials as formaldehyde, furfural alcohol, polyvinyl alcohol, or amines to produce a thermosetting adhesive suitable for particle board production. As another example, Stofko (U.S. Pat. Nos. 4,107,379 and 4,183,997) proposed formulations that used a variety of carbohydrates sources and reactions under acidic conditions with different modifiers to produce thermosetting water-resistant adhesives.

K. C. Shen (U.S. Pat. No. 5,017,319, EP-B-0,161,766 and EP-A-0,492,016) converted ligno-cellulosic material directly into both thermosetting resin adhesive and composite products by selectively hydrolyzing and decomposing hemicellulose and/or cellulose fractions, using high pressure steam, into low molecular weight water-soluble resin material including pentose and hexose sugars, sugar polymer, furfural, hydroxymethyl furfural, dehydrated carbohydrates, organic acids and other decomposition products. The water-soluble resin material alone, thus produced, can be used in liquid or powder form as a thermosetting water-proof resin adhesive.

Since lignin is believed to be the natural binder within lignocellulose and is phenolic in nature, it has been extensively studied and researched in the past hundred years as a binder for lignocellulosic composite products.

In U.S. Pat. No. 726,029, A. Classen used steam to treat saw dust with acid and then cooked the acidified saw dust under pressure at a temperature of 105 to 145° C. for 30 to 60 minutes to render the hemicellulose water-soluble. After cooking, the treated mass was washed with water to remove the water-solubles before drying and molding into composite products. U.S. Pat. No. 2,303,345 by Mason and Boehm described a process of making strong products from lignocellulosic material. Mason and Boehm employed high pressure steam to separate lignin from lignocellulosic material for bonding. In their process, the hemicellulose was hydrolysed into water-solubles and removed from the treated lignocellulose before the fibres and lignins were made into hard board. Under high temperature and pressure lignins were melted as a binder to cement fibres a into a high density hard board. The water-solubles, consisting mainly of reducing sugars, were concentrated into wood molasses commonly used in animal fodder. Although the well-known Masonite process of making hard board, using natural lignin as binder, has been in commercial production since the 1930s in USA and other countries, it is now an industry in decline due to inefficiencies and environmental concerns about the enormous quantities of waste water.

Other investigators have used lignin from the pulping industry in combination with phenol-formaldehyde resin to form copolymer resin adhesives. In U.S. Pat. No. 2,786,008, R. Herschler incorporated ammonium based spent sulfite liquor, or lignosulfonates, a by-product of sulfite pulping industry, into an acid tolerant thermosetting phenolaldehyde resin for bonding plywood and fibre board. In UK-A-1,404,536, K. Forss proposed a system of incorporating high molecular weight lignins, fractionated from lignosulfonates, into a phenol-formaldehyde resin to yield a copolymer thermosetting adhesive for bonding plywood and fibre board in sulfite pulping, both lignin and hemicellulose fractions are solubilized during acidic cooking and washed off as spent sulfite liquor effluent. In the past, this waste material was discharged into rivers and streams causing severe water pollution. Today, pulp mills in North America are equipped to recover the waste liquor and use it for boiler fuel. A very small fraction of the spent sulfite liquor is processed into useful products for industrial application.

U.S. Pat. No. 4,193,814, issued to K. C. Shen, describes a method of using calcium, sodium, magnesium and ammonium based spent sulfite liquor, or lignosulfonates as a thermosetting adhesive for bonding wood composite products. This process involved treating the spent sulfite liquor with sulfuric acid to activate the lignosulfonic acids and convert the spent sulfite liquor into a highly acidic thermosetting adhesive. Further, in U.S. Pat. No. 4,265,845 K. C. Shen et al. found that ammonium based spent sulfite liquor, without any modification or addition of chemicals, could be thermoset to yield a water-proof bond. Fractionation of the spent sulfite liquor to contain a high proportion of the low molecular weight fraction further improved the adhesive quality. However, the improved spent sulfite liquor adhesive still required high press temperature and long press time to thermoset or cure into a water-proof bond.

Trees contain about 15 to 20% by weight of bark. Therefore the wood processing industry generates enormous amounts of bark as waste which at present are simply being used as boiler fuel having a very low economic value. The barks of various trees and certain agricultural wastes contain organic extracts of which phenolic compounds are the major constituents. These extracted phenolic compounds constitute the starting material for the production of adhesives and are available from the wood industry's own resources and from agricultural resources. A waste material itself, bark is generally a much richer source than wood for extracts, the most important being monomeric polyphenol or flavonoid compounds, and polymeric phenolics, such as tannins, phlobophenes and phenolic acids. There is no real difference between phenols and tannins since both are phenolic in character. There are two types of tannins: condensed and hydrolyzable. Condensed tannins, using phenolic components from bark extract or from certain agricultural residues, with the addition of formaldehyde, have been used from time to time as a resin adhesives for bonding plywood and particle board. Tannin extractives from the bark of Acacia (wattle of mimosa bark extract) and the wood of Quebracho normally fortified with a small portion of synthetic phenol-formaldehyde resin have been used in the commercial production of exterior grade plywood and particle board in certain countries. However, there are practical and cost limitations associated with the use of tannin adhesives, which have restricted their application for wider commercial use.

It is well known that carbohydrate and lignin based adhesives have not achieved commercial success due to some fundamental flaws, such as high acidity, slow curing rates/longer press times, and low tolerance to high moisture content during processing. Similarly, tannin-formaldehyde adhesives suffer from a variety of short-comings, such as weak cohesive strength, short pot-life, pre-cure and high viscosity. These problems not only affect bonding qualities, but also pose difficulties in production, processing and handling.

It has been found, however, unexpectedly and surprisingly that prehydrolysis of lignocelluloses with acids or acid liberating chemicals under optimum conditions without washing out the hydrolysis products enhance the bondability of lignocellulosic materials with tannin-formaldehyde resins. This was insofar unexpectedly as the conventional teaching is that the addition of carbohydrates is detrimental to the overall bonding quality of tannin-formaldehyde bonded boards (see Pizzi, A. "Tannin Based Wood Adhesives" at page 215, Wood Adhesives: Chemistry and Technology, Marcel Dekker, New Yok: 1983, and Hemingway et al. "Condensend Tannin: Problems and Prospective for their extended Use in Wood Adhesives" at page 164, Wood Adhesives in 1985: Status and Needs: Proceeding of the Conference with the Forest Products Research Society).

The prehydrolysis step leading to the formation of degration products of carbohydrates and lignin seems to have a dual effect on bonding. It increases the physical accessibility of the lignocelluloses towards bonding. Moreover, the degration products seem to have inherent bonding potential as they copolymerise with tannin-formaldehyde resin used for bonding.

It has now been found also, however, that copolymer adhesives of carbohydrates, lignin and tannins alleviate common problems inherent to carbohydrates, lignin and tannin-formaldehyde based resins, such as high acidity, slow curing, low cohesive strength, short pot life, high viscosity and pre-curing. The incorporation of black liquor or wood molasses and spent sulfite liquor or lignosulfonate, waste by-products from the hard board and pulping industries, respectively, into the copolymer resin system makes it economically efficient and environmentally attractive.

Renewable source thermosetting adhesives entirely based on lignocellulose vegetation offer permanent solutions to the wood industry. Although tannins are relatively expensive and limited in production quantity, up to 400,000 tons per year worldwide for condensed tannins, a thermosetting adhesive consisting of a minor portion of tannin and a major portion of carbohydrates and lignins would provide a significant economic advantage to the wood industry. The lower cost adhesives will allow for the application of higher resin content to produce new and/or better quality composite products.

Insofar the present invention provides: an adhesive composition comprising a product produced by copolymerization of one or more phenolic compounds and one or more water-soluble carbohydrates; or a mixture comprising one or more phenolic compounds or one or more water-soluble carbohydrates, the one or more phenolic compounds being copolymerizable with the one or more water-soluble carbohydrates.

It may be preferable that the carbohydrates comprise reducing sugars or other reducing carbohydrates.

The invention is more in detail but without restriction illustrated by the following Examples:

EXAMPLE 1

Chips made from pine were prehydrolysed with sulphuric acid at a concentration 0,01% based on dry wood at a temperature o 200° C. for 3 min. For this purpose the chips were sprayed with sulphuric acid solution and treated with pressurized steam at 200° C. After such a treatment the chips were dried and glued with tannin-formaldehyde resin at a level of 10% resin based on dry wood to a particle board with a density of 0,7 g/cm$^3$. For comparison particle boards were made from the same raw material without acid treatment. Boards treated with acid showed lower thickness swelling and better dimensional stability compared to those prepared without acid treatment.

EXAMPLE 2

This example describes the use of bark extract from Western hemlock in combination with black liquor, a by-product from a wet process hard board mill, for bonding particle board.

Hemlock bark was dried to a moisture content (M.C.) of less than 5% and hammer milled into fine particles, passing 1 mm mesh screen. 10 kg bark particles were mixed with hot water to which about 2% of sodium carbonate was added as extractant. The bark slurry was vigorously stirred in hot water (70–80° C.) for about 45 minutes and filtered. The extract was mixed with 0,3% sodium sulfite based on oven dry (O.D.) weight of bark particles and evaporated under vacuum to a concentration of about 38% solids. The yield of extract solids was about 16.6% of the original O.D. bark weight The polyphenolic content in the extract was determined to be about 10.2% based on the original O.D. bark particle weight. The black liquor, a wood molasses and by-product from a wet process hard board mill, consisted mainly of reducing sugars derived from hemicellulose hydrolysis. Hydrolysis of hemicelluloses yield a mixture of D-glucose, D-mannose, D-xylose, D-galactose, L-arabinose, and small amounts of sugar acids. The soldis content of the black liquor was about 52% with a pH of 4.2.

Forty-five parts by solids weight of the hemlock bark extract was mixed with forty-five parts of the black liquor solids and ten parts of 95% paraformaldehyde powder to formulate a copolymer resin adhesive for making pine planer shaving boards. This liquid copolymer resin adhesive had a solids content of 50%, having a pH of 4.8 and a viscosity of 387 cps (Brookfield, 25° C.). Dry pine shavings were sprayed with 10% copolymer liquid resin based on O.D. weight of pine shavings. After spraying, the resinated shavings were hand felted into a homogeneous mat. The mat was pressed at platen temperature of 220° C., under an initial pressure of 30 kg/m$^2$ for 5 minutes to produce a 12 mm thick board (650×650 mm) having a density of about 740 kg/m$^3$. This results are listed in Table 1.

TABLE 1

Properties of 12 mm shaving board bonded with 10% copolymer resin adhesive

| Density | MOR (MPa) | | MOE | IB | Swelling (%) | |
| --- | --- | --- | --- | --- | --- | --- |
| (kg/M$^3$) | dry | boil | (GPa) | (kPa) | Soak | Boil |
| 757 | 19.3 | 9.7 | 37.2 | 580 | 8.5 | 32.7 |
| CAN0188.2-M78 | 17.2 | 5.0 | 25.0 | 500 | — | |

EXAMPLE 3

This example demonstrates the use of water-soluble resin material derived from hydrolyzed pine sawdust and modified with hemlock bark extract and formaldehyde to formulate a copolymer adhesive for bonding particle board. Wet pine sawdust was first impregnated with 0.2% sulphuric acid in dilute solution and steamed at 10.5 bar (180° C.) for 30 minutes. The steamed hydrolysed sawdust was eluted with hot water and the solution was evaporated under vacuum to a concentration of about 50% solids with a pH of 3.5. The yield of water-solubles was about 17% solids based on the original O.D. weight of pine sawdust. This water-soluble low molecular weight resin material derived from hemicellulose hydrolysis consisted of pentose and hexose sugars, sugar polymer, furfural, hexamethyl furfural, dehydrated carbohydrates, organic acids and other decomposition products, with a small portion of lignin decomposition products. This carbohydrate based resin adhesive can be thermoset to produce a water-proof bond, but required higher pressing temperature and longer pressing time. This carbohydrate based liquid resin was mixed with liquid hemlock bark extract (the same material as used in Example 1) and 95% paraformaldehyde powder at a ratio of 50:40:10 base on O.D. weight of these components. The copolymer adhesive had a pH of 3.9, viscosity of 250 cps and was ready for spraying to pine wood particles for making a 3-layer exterior grade particle board.

Dry fine pine particles of less than 20 mesh size were sprayed with 12%, by weight, of the liquid copolymer adhesive based on oven dry weight of pine particles. The large size core particles, larger than 20 mesh and smaller than 4 mesh, were sprayed with 8% of the mixed adhesive. The resinated face particles had a moisture content of about 15–18% and the core particles had a moisture content of about 8–12%. A 3-layer construction particleboard (450× 350×16 mm) was formed with 50% fine particles for the face layers and 50% large particles for the core layer. The mat was pressed at 210° C. under an initial pressure of 30 kg/M$^3$.

Under the same condition two boards bonded with the water-soluble carbohydrates resin were produced with much longer press times of 10 & 12 minutes respectively. As can be seen from Table 2 board bonded with the copolymer adhesive required only 4 minutes to thermoset while board bonded with water-soluble carbohydrates based adhesive took 12 minutes to produce a boil resistant bond. The board bonded with the copolymer adhesive was less odourous and had a lighter colour than the board bonded with water-soluble carbohydrates.

TABLE 2

Properties of 16 mm particleboards bonded with copolymer adhesive and carbohydrate based adhesive

| Board ID | Press time | Density | MOR (MPamPa) | | MOE | IB | 24 hr Swell |
| --- | --- | --- | --- | --- | --- | --- | --- |
| adhesive | (min) | (kg/M$^3$) | dry | boil | (GPa) | (kPa) | (%) |
| Copolymer | 4 | 786 | 17.6 | 9.2 | 37.2 | 560 | 8.2 |
| Carbohydrate | 10 | 782 | 17.5 | 3.2 | 30.7 | 380 | 25.6 |
| " | 12 | 779 | 18.2 | 9.8 | 38.4 | 570 | 7.7 |
| CAN0188.2-M78 | | | 17.2 | 5.0 | 25.0 | 500 | |

EXAMPLE 4

This example demonstrates the use of spent sulfite liquor, a waste by-product of sulfite pulping process, in combination with mimosa tannin powder, derived from black wattle bark, a commercial product from South Africa, to produce a copolymer liquid resin adhesive. This copolymer resin adhesive was used to manufacture exterior grade poplar wafer board. The spent sulfite liquor, an ammonium based lignosulfonate, was drained off from a chip digester at a Canadian pulp mill and evaporated under vacuum to a concentration of about 31% solids content The concentrated spent sulfite liquor consisted mainly of lignins (61%) and reducing sugars (32%), had a viscosity of 85 cps, and a pH of 3.9. The reducing sugars were derived from hemicellulose hydrolysis and consisted mainly of monomeric xylose, glucose, mannose, galactose.

One hundred and sixty parts by weight of the concentrated spent sulfite liquor was admixed with fifty parts by weight of mimosa tannin powder and then subsequently mixed with ten parts by weight of 95% paraformaldehyde powder. The copolymer liquid resin adhesive had a solids content of about 50%, a pH of about 4.8, and a viscosity of 378 cps. Commercial poplar wafers were sprayed with the liquid copolymer resin adhesive at a rate of 6% solids weight based on O.D. weight of poplar wafers. In addition, 1% by weight of molten slack wax was also sprayed onto the wafers. The resinated wafers were hand felted into mats that were hot pressed at 210° C. and a pressure of 35 kg/cm², for 3, 4 and 5 minutes respectively, resulting in three wafer boards of 460×460×11.1 mm, with an average density of about 680 kg/m³. The wafer boards were conditioned for three days and then tested in accordance with CAN 3-0188.0-M78 standard test method for wafer board. Test results are summarized in Table 3.

TABLE 3

Properties of 11.1 mm poplar waferboards bonded with 6% copolymer liquid resin adhesive (spent sulfite liquor and tannin resin adhesive)

| Board ID | Press time (min) | Density (kg/M³) | MOR (MPamPa) dry | MOR (MPamPa) boil | MOE (GPa) | IB (kPa) | 24 hr Swell |
|---|---|---|---|---|---|---|---|
| 1 | 3 | 650 | 23.5 | 10.7 | 4030 | 440 | 12.6 |
| 2 | 4 | 664 | 24.5 | 12.3 | 4240 | 485 | 10.4 |
| 3 | 5 | 673 | 24.7 | 13.6 | 4380 | 480 | 9.6 |
| CAN3-0437.0M86 | | | 17.2 | 8.6 | 3100 | 345 | 25.0 |

EXAMPLE 5

This example describes the use of sugar molasses, quebracho tannin, pine bark fine powder and formalin to formulate a copolymer resin adhesive for bonding a 3-layer poplar particle board.

The sugar molasses was obtained from a beet sugar refinery with solids content of 68% and pH of 9.3.—Quebracho tannin powder—was dissolved into the molasses with sodium hydroxide solution to adjust the pH of the mixture to 12.6 and the solids content of 42%.—To this mixture was added 10% dry weight of pine bark powder (<0.125 mm based on O.D. weight of wood particle furnish) and an equal amount of water.—To this mixture 9% formaldehyde (30% solution formalin) based on solids weight of tannin powder and beet molasses was added to form a viscous liquid. —This catalyzed adhesive mixture had a relatively long pot life, more than 7 hours, after the addition of formaldehyde.—This resin adhesive was blended with particle furnish to contain 12% resin solids for face furnish and 10% for core furnish particles. The moisture content for the face furnish was about 28% and for the core particles 16%—A three layer particle board of 16 mm thickness of 600 mm×600 mm size was pressed at 200° C. for two and a half minutes.—Test results are summarized in the following table:

TABLE 4

Properties of 3-layer particle board bonded with sugar molasses, quebracho tannin, pine bark powder, copolymer resin adhesive

| Board ID | Press temp/time ° C./min | Density (kg/m³) | MOR (MPa) dry | MOR (MPa) boil | MOE (MPa) | IB (kPa) | Swell (%) Boil/Soak (2 h)/(24 h) |
|---|---|---|---|---|---|---|---|
| 1 | 200/2.5 | 755 | 19.3 | 8.2 | 3260 | 850 | 21.5/10.2 |
| CAN3-188.2-M78 | | | 17.2 | 5.0 | 2500 | 500 | 25.0/na |

The use of pine bark powder is particularly beneficial:—direct use of tannin in the pine bark as adhesive and as well as a filler, proportionally enhances bonding efficiency, reduces wood particle furnish in the particle board and acts as a scavenger to reduce free formaldehyde.

EXAMPLE 6

This example describes the use of commercial sugar products in combination with western hemlock bark extract, as a thermosetting adhesive for bonding plywood. Purified granulated sugar, a disaccharide of glucose and fructose derived from sugarcane, and corn syrup, consisting mainly of glucose derived from corn starch, were used, respectively, in combination with western hemlock bark extract solids, to formulate copolymer adhesives. Sucrose and corn syrup were separately mixed with water to obtain a solution of 50% concentration or solids content. To each solution, 5% ammonium sulfate powder, O.D. basis, was added. Each solution was heated to boiling point until the solution turned brownish in colour before being mixed with equal parts of western hemlock bark extract solution at 50% solids. After mixing, 10% by weight of 95% paraformaldehyde powder was added to each of the copolymer adhesives, based on O.D. weight. The sucrose-phenolic copolymer liquid adhesive had a solids content of about 51.3%, a pH of 6.8 and a viscosity of 142 cps. The corn-syrup phenolic copolymer liquid adhesive had a solid content of 52.5%, a pH of 5.6 and a viscosity of 395.

These two carbohydrates-phenolics copolymer liquid adhesives were used for bonding plywood. Fabrication of 3-ply birch plywood was performed under identical conditions as described in the previous Example 4. The same cycle of boiling-drying treatment was also carried out on the plywood test specimens. After 5 cyclic treatments, these plywood specimens remained intact and showed no sign of delamination along the glue lines.

EXAMPLE 7

This example demonstrates the production of exterior grade medium density fibre board (MDF) with addition of liquid mimosa tannin and formaldehyde resin in combination with the water-soluble resin material (carbohydrates) already existing in the pine wood fibre, at a conventional MDF manufacturing facility. Pine wood chips, as they entered the pressurized cooker (digester), were sprayed with dilute solution of sulfuric acid (2,5% concentration by weight) at a rate of a 0.1% based on oven dry weight of pine chips, cooked under a steam pressure of 10.5 bar (186.5° C.) for about 10 minutes before being extruded through a disc refiner and converted into fibre. The wet pine fibre had a pH of 3.9 and contained about 16.2% water-soluble resin material derived from hemicellulose hydrolysis, resulting from the ten minute cooking. The wet fibre was then blended with liquid tannin and formaldehyde solution (20% solids content) at a rate of 4% based on O.D. weight of pine fibre and dried to 4–6% M.C. and formed into a mat, which was pressed in a continuous press to produce an 8.5 mm MDF with a density of about 870 kg/m³. During pressing the water-soluble resin material present in the fibre copolymerized in situ with the added tannin-formaldehyde resin and thermoset to form a strong bond. This 8.5 mm MDF had good physical properties suitable for all purpose interior applications. However, this 8.5 mm MDF was further given a post-heating treatment, resulting in an exterior grade, or V100 grade MDF (German standard DIN 68761). The most effective methods of carrying out the post-heating treatment were to press the freshly made MDF between two heated platens for a few minutes, or to put the MDF into a hot oven for a few hours. A full size MDF was put into a single opening press with a platen temperature maintained at 230° C. The MDF was pressed at 2 bar of pressure to make full contact of MDF with the platens, for 3 minutes. Another MDF, while it was still hot from the continuous press, was put into an oven set at 180° C. temperature with forced circulation, for 3 hours. Test results of the controlled MDF along with post-heat treated MDF are listed in Table 5.

TABLE 5

Properties of 8.5 mm MDF bonded in situ with Carbohydrate and Liquid-Tannin-Formaldehyde Copolymer Adhesive

| Post-heating treatment | Density (kg/M³) | MOR (MPamPa) | MOE (GPa) | IB (kPa) dry | IB (kPa) V-100 | Swell (%) 24 hr soak | Swell (%) 2 hr boil |
|---|---|---|---|---|---|---|---|
| none | 882 | 36.2 | 42.6 | 0.95 | — | 8.2 | — |
| post oven heating (180° C./ 3 hr) | 876 | 37.3 | 44.7 | 1.05 | 0.36 | 4.3 | 15.6 |
| post press heating (230° C./ 3 min) | 879 | 38.1 | 44.1 | 1.07 | 0.55 | 3.7 | 14.4 |
| DIN 68761 | | | | | 0.15 | | |

EXAMPLE 8

This example describes the use of a copolymer resin adhesive consisting of tannin powder, black liquor, spent sulfite liquor and 95% paraformaldehyde powder, for bonding foundry sand. Fifty-five parts by O.D. weight of the black liquor (the same material as used in Example 1), thirty-five parts of the ammonium based lignosulfonate (the same material as used in Example 3), fifteen parts of mimosa tannin powder and thirteen and a half parts of formalin solution (37% with 5% methanol) were put together and mixed thoroughly with addition of water to formulate a liquid resin adhesive with a solids content of about 50%.

A 60 gram sample of the liquid adhesive was mixed with 2 kg of AFS GEN 60 sand, resulting in a resin content of 1.5% by weight of the sand. The resin coated sand was then used to produce 6.3 mm thick tensile specimen (dog bones) by heating hand rammed sand between a pair of hot plates at 250° C. for 2, 3 and 4 minutes respectively, to cure and thermoset the resin adhesive. All heated solids turned brownish in colour.

Edge retention and surface definition appeared normal. Test results of tensile strengths, curing time and results from a commercial phenolic resin are summarized in Table 6.

TABLE 6

Tensile strength vs. curing time

| Curing time (min at 250° C.) | Tensile strength vs. Curing time (1.5 % copolymer adhesive) |
|---|---|
| 2 | 645 |
| 3 | 686 |
| 4 | 722 |
| commercial phenolic resin | 700 |

Strength figures were the average of the two tests. Additional specimens were made one week later from the original batch of bagged resin coated sand. Tensile strengths were not changed. This indicated that the pre-mixed sand has a long shelf life. By contrast, liquid tannin formaldehyde resin used alone had a shelf life of only a few hours.

What is claimed is:

1. A method for producing chip or fibre board articles by bonding particulate lignocellulosic material chips or fibres with one or more adhesives, the adhesives consisting essentially of one or more tannin resins or tannin containing resins, wherein the lignocellulosic material is pre-hydrolyzed by means of adding acids, acidic salts or other acid liberating chemical compounds prior to adding a composition of adhesive material.

2. The method according to claim 1, wherein an adhesive composition comprising tannin is combined and diluted with a sulfite liquor or with one or more carbohydrates selected from monomeric sugars or with a combination thereof is added.

3. A method for the preparation of bonded lignocellulosic materials, comprising the steps of:

(1) treating the lignocellulosic material with a diluted solution comprising an acid or an acid-releasing material, without subsequently washing out the hydrolysis products;

(2) adding a binder to the treated lignocellulosic material, the binder consisting essentially of: (a) a composition containing tannin, and (b) formaldehyde; and (3) subjecting the lignocellulosic material under pressure to steam treatment.

4. The method of claim 3, wherein the binder further comprises at least one compound selected from sugars, starches, or mixtures of two or more thereof.

5. The method of claim 3, wherein the lignocellulosic material is pretreated with sulfuric acid at a concentration of 0.01% based on the weight of the dry lignocellulosic material.

6. The method of claim 4, wherein the lignocellulosic material is pretreated with sulfuric acid at a concentration of 0.01% based on the weight of the dry lignocellulosic material.

7. The method of claim 4, wherein the least one compound of the binder is selected from black liquor, hydrolyzed sawdust, spent sulfite liquor, sugar molasses, a purified granulated sugar, or corn syrup.

8. The method of claim 5, wherein the least one compound of the binder is selected from black liquor, hydrolyzed sawdust, spent sulfite liquor, sugar molasses, a purified granulated sugar, or corn syrup.

9. The method of claim 3, wherein the tannin composition contained in the binder is derived from the bark of trees.

10. The method of claim 9, wherein tannin is derived from the bark of mimosa or hemlock or the wood of Quebracho.

11. The method of claim 9, wherein bark powder is a source of obtaining the tannin composition.

* * * * *